United States Patent Office 3,560,557
Patented Feb. 2, 1971

3,560,557
DIPHENYL-UREAS, -THIOUREAS, -GUANIDINES AND -PARABANIC ACIDS
Adrian Marxer, Muttenz, Switzerland, assignor to Ciba Corporation, New York, N.Y.
No Drawing. Continuation-in-part of application Ser. No. 594,386, Nov. 15, 1966, which is a continuation-in-part of Ser. No. 589,195, Oct. 25, 1966. This application July 11, 1967, Ser. No. 652,409
Claims priority, application Switzerland, Nov. 19, 1965, 15,988/65; Sept. 29, 1966, 14,092/66
Int. Cl. C07c *127/00*
U.S. Cl. 260—501,14          9 Claims

ABSTRACT OF THE DISCLOSURE

Diguanylhydrazones of diphenyl-ureas, -thioureas, -guanidines and -parabanic acids that contain in each of the two phenyl radicals a meta- or para-positioned alkanecarbonyl group, especially para,para'-diacetyl-diphenylurea-bis-guanylhydrazone of the formula

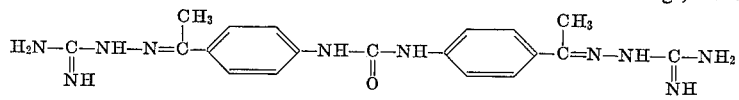

salts thereof and pharmaceutical compositions containing them display a tumour inhibiting action and act against protozoae and amoebae.

CROSS-REFERENCES TO OTHER APPLICATIONS

This is a continuation-in-part of my application Ser. No. 594,386, filed Nov. 15, 1966 which is, in turn, a continuation-in-part of my application Ser. No. 589,195, filed Oct. 25, 1966 (now abandoned).

SUMMARY OF THE INVENTION

The present invention relates to new guanylhydrazones, Especially it concerns diguanylhydrazones of diphenyl-ureas, -thioureas, -guanidines and -parabanic acids that contain in each of the two phenyl radicals a meta- or para-positioned alkanecarbonyl group, above all corresponding diphenyl-ureas, -thioureas, -guanidines and -parabanic acids that contain in each phenyl radical a meta- or para-positioned alkanecarbonylguanylhydrazone grouping of the formula

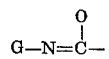

in which G represents a guanidino group and R a lower alkyl radical, preferably a methyl, ethyl, propyl, butyl or pentyl radical, and their salts, as well as corresponding pharmaceutical compositions, their use in medicine, and processes for the preparation of the new compounds or preparations. The new compounds possess valuable pharmacological properties, especially a tumour inhibiting action as is found in the animal test, for example on the mouse. Furthermore, the new compounds act against protozoae and amoebae, especially against trypanosomes, for example against *Trypansoma gambiense* and *Trypanosoma congolense*. They may therefore be used as chemotherapeutics for treating tumours, as trypanocidal and amoebicidal agents. Furthermore, they may be used as intermediates, for example in the manufacture of pharmacologically active compounds.

DESCRIPTION OF THE PREFERRED EMBODIMENTS

The new compounds may contain further substituents, for example on the nitrogen atoms of the guanidino group of the guanylhydrazone grouping, above all lower aliphatic hydrocarbon radicals, such as lower alkyl groups, for example those mentioned above, or in the aromatic rings, for example lower alkyl groups, such as those mentioned above, or lower alkoxy groups, for example methoxy, ethoxy, propoxy or butoxy groups, or above all halogen atoms, such as chlorine or bromine atoms, or trifluoromethyl groups.

Particularly potent are the compounds of the formula

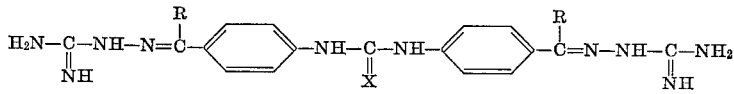

and

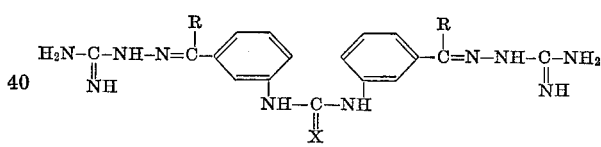

in which R has the above meaning and represents in the first place methyl and X represents an imino group, a sulfur atom or more especially an oxygen atom, and the compounds of the formula

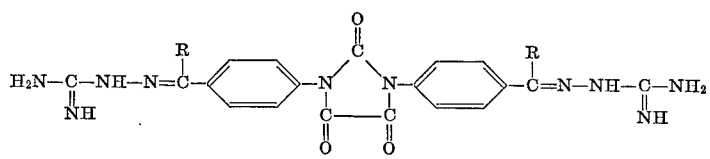

and

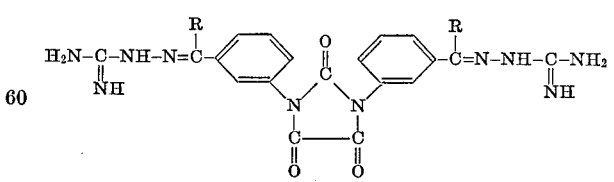

in which R has the above meaning and especially para, para'-diacetyl-diphenylurea-bis-guanylhydrazone which, for example, in the form of its dihydrochloride dihydrate produces in leucaemic (L 1210) mice on intraperitoneal administration in doses of 10 to 30 mg. per kg. bodyweight a distinct life-prolonging effect.

Furthermore para,para'-diacetyl-diphenylurea-bis-guanylhydrazone and its therapeutically acceptable salts are active in a dose of about 30 to 50 mg./kg. i.p. in the following tumours of the mouse: Leucaemia P 133, P 153435, L 5178 Y, P 288, AK4, P 815, in ascites, such as Ehrlich carcinoma, and in spontaneous cancers of the breast (20–40 mg./kg.); and in the following tumours of the rat in doses of 50–75 mg./kg. i.p.: Walker 256, T8 Guerin uterus-epithelioma, Flexner Joblin carcinoma.

On the basis of this evidence the para,para'-diacetyl-diphenylurea-bis-guanylhydrazone and its therapeutically acceptable salts can be administered in medicine in order to inhibit or slow down the progress or to bring about remission of the respective tumours especially in cases of lymphaticmyeloblastoses, such as para-leukoblast leukemia, myeloic leukemia, lymphatic leukemia, Hodgkin's disease, Reticulosarcoma, and in cases of other malignoma of the lymphomyeloic system; it may also be used in cases of epithelial tumours, such as of the gastro-intestinal tract, the respiratory passages, the urogenital system (including tumours of the uterus, and chorionic epithelioma), tumours in the head and neck (larynx, tongue, throat), of the endocrine and other glands (cancer of the breast, tumours of the pancreas, of the thyroid gland, etc.); furthermore in cases of mesenchymal tumours, such as tumours of bones, cartilages, and muscles, as also in the central nervous system, and also in cases of malignant mixed tumours. The daily dose will vary according to the nature of the illness and the condition of the patient; usually it is 1–5 mg., in most cases 2 mg. per kg. bodyweight parenterally, e.g. intravenously.

The para,para'-diacetyl-diphenylurea-bis-guanylhydrazone and its therapeutically acceptable salts do also synergistically enhance the activity of other tumour-inhibiting products, such as arabinosyl-cytosin. Therefore the invention comprises also pharmaceutical compositions containing para,para'-diacetyl-diphenylurea-bis-guanylhydrazone or its therapeutically acceptable salts, in combination with another tumour-inhibiting compound, especially arabinosyl-cytosin, and the therapeutic use of such compositions or of para,para'-diacetyl-diphenylurea-bis-guanylhydrazone or a therapeutically acceptable salt thereof simultaneously with arabinosyl-cytosin.

The new compounds are obtained by known methods. Advantageously, a diphenyl-urea, -thiourea, -guanidine or -parabanic acid that contains in each of the two phenyl radicals a meta- or para-positioned alkanecarbonyl radical, a lower alkanecarbonyl group, for example the acetyl, propionyl, butyryl or oenanthoyl group, is reacted with a guanylhydrazine. The guanylhydrazine is advantageously used in the form of a salt thereof.

The reaction is carried out in the conventional manner.

Depending on the reaction conditions and the starting materials used the end products are obtained in the free form or in the form of their salts or, if desired, the hydrates, which are also included within the scope of the invention. The salts of the final products may be converted in a manner known per se, for example with an alkali or an ion exchanger, into the free bases. From the latter salts may be obtained by reaction with organic or inorganic acids, particularly those which are suitable for the formation of therapeutically acceptable salts. Suitable acids are, for example: hydrohalic acid, sulfuric acids, phosphoric acids, nitric acid; aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, para-aminobenzoic, anthranilic, para-hydroxybenzoic, salicylic or para-aminosalicylic, embonic, methanesulfonic, ethanesulfonic, hydroxyethanesulfonic, ethylenesulfonic acid; halogenbenzene-sulfonic, toluene-sulfonic, naphthalenesulfonic acids or sulfanilic acid; methionine or tryptophan.

These or other salts of the new compounds may be used for purifying the free bases by converting the free bases into salts, separating the latter and then liberating the bases again. In view of the close relationship between the new compounds in the free form and in the form of their salts, what has been said above and herein after with reference to the free compounds refers similarly also to the corresponding salts wherever this applies.

The invention also concerns those modifications of the process in which a compound obtainable as intermediate at any stage of the process is used as starting material and the remaining process steps are carried out, or in which a starting material is formed in situ or used in the form of a salt.

The starting materials are known or, if they are new, can be prepared by a method known per se.

For the reactions of the invention such starting materials are used as yield the above-mentioned preferred compounds.

The new compounds may be used for example in the form of pharmaceutical preparations which contain them or their salts in conjunction or admixture with an organic or inorganic, solid or liquid pharmaceutical excipient suitable for enteral, parenteral or local administration. Suitable excipients are substances that do not react with the new compounds, for example water, gelatin, lactose, starches, stearyl alcohol, magnesium stearate, talcum, vegetable oils, benzyl alcohols, gums, polyalkylene-glycols, white petroleum jelly, cholesterol or other known medicinal excipients. The pharmaceutical preparations may be, for example, tablets, dragees, capsules, suppositories, ointments or creams, or in liquid form solutions, suspensions or emulsions. They may be sterilized and/or may contain auxiliaries such as preserving, stabilizing, wetting or emulsifying agents, solution promoters, salts for regulating the osmotic pressure or buffers. They may also contain other therapeutically valuable substances. The pharmaceutical preparations are formulated by known methods. They advantageously contain 10–50 mg. of the active substance per dosage unit.

The new compounds may also be used in the form of feeding stuffs or additives to feeding stuffs, using, for example, the conventional extenders and diluents or feeding stuffs respectively.

The following examples illustrate the invention.

EXAMPLE 1

39.2 grams of aminoguanidine bicarbonate in 60 ml. of water are mixed with 61.5 ml. of 6.17 N hydrochloric acid. The resulting solution of aminoguanidine hydrochloride is mixed with 29.63 g. of para,para'-diacetyl diphenylurea and then with 200 ml. of dimethylformamide and the mixture is heated with stirring for 10 hours in an oilbath at 80° C. The batch is filtered, concentrated in vacuo to half its original volume, and 150 ml. of water are added, the contents of the flask crystallizing. The batch is first crystallized from 100 ml. of dimethylformamide with the addition of 200 ml. of water, then from 100 ml. of dimethylformamide with the addition of 200 ml. of ethanol. The resulting crystals melt at 238–242° C. with decomposition and are para,para'-diacetyl-diphenylurea bis-guanylhydrazone dihydrochloride dihydrate of the formula

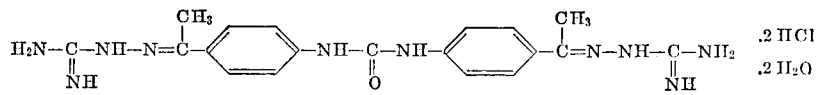

25 g. of the dihydrochloride are poured into 1.5 liters of boiling water and stirred to give a clear solution. The solution is filtered, cooled on an ice-water bath rapidly to 30° C. and, before the dihydrochloride crystallizes out again, 150 ml. of 2 N sodium hydroxide solution are added in one portion. The first amorphous precipitate soon becomes crystalline on cooling. The batch is suction-filtered and the precipitate washed on the filter with water and ethanol, to yield p,p'-diacetyl-diphenylurea-bis-guanylhydrazone melting at 221–223° C. with decomposition.

20.42 g. (0.05 mol) of this compound are suspended in 250 ml. of absolute ethanol, and treated with 52 ml. of 2 N ethanolic methanesulfonic acid. 60 ml. of water are added successively to the suspension with heating on a water-bath until a clear solution is formed. The solution is filtered, 300 ml. of absolute ethanol are added and the product allowed to crystallize out. After filtering with suction and drying, p,p'-diacetyl-diphenylurea-bis-guanyl-hydrazone-bis-methanesulfonate melting at 179–183° C. is

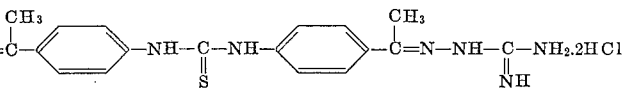

obtained. After drying in a high vacuum, the product melts at 190–195° C.

EXAMPLE 2

39.2 grams of aminoguanidine bicarbonate in 60 ml. of water are mixed with 60 ml. of 6.43 N hydrochloric acid. The resulting solution of aminoguanidine hydrochloride is mixed with 29.63 g. of para,para'-diacetyl diphenylurea and then with 200 ml. of dimethylformamide, and the mixture is heated with stirring for 5 hours in an oilbath at 150° C. The batch is then filtered, concentrated under vacuum to half its original volume, and 300 ml. of absolute ethanol are added, whereupon the batch turns crystalline; it is suspended in 200 ml. of water, suction-filtered and recrystallized from 500 ml. of a 2:3-mixture of ethanol and water, while removing part of the solvent under vacuum when all has dissolved and replacing it by fresh absolute ethanol until crystallization sets in. The crystals obtained constitute para,para'-diacetyl-diphenylurea-bis-guanylhydrazone dihydrochloride dihydrate which is identical with the product described in Example 1.

EXAMPLE 3

19.6 grams (0.144 mol) of aminoguanidine bicarbonate are dissolved in a mixture of 30 ml. of water and 29.3 ml. (0.18 mol) of 6.15 N hydrochloric acid. 14.85 grams (0.05 mol) of meta,meta'-diacetyl-diphenylurea in 100 ml. of dimethylformamide are added to the solution and the whole is rapidly heated to an internal temperature of 100° C., then stirred on for 5 hours in an oilbath maintained at 130° C., filtered and evaporated to dryness under vacuum. The residue is dissolved in 150 ml. of ethanol and once more evaporated to dryness. Finally, the residue is mixed with 50 ml. of ethanol and left to itself, whereupon gradually very finely crystalline meta,meta'-diacetyl-diphenylurea - bis - guanylhydrazone - dihydrochloride dihydrate of the formula

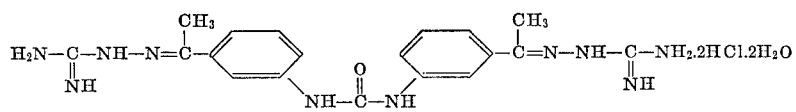

settles out. It melts at 269 to 272° C. The water of crystallization can be removed by drying above 100° C. in a high vacuum. The anhydrous substance is hygroscopic and rapidly reabsorbs 2 mols of water. m,m-Diacetyl-diphenyl-urea-bis-guanylhydrazone melting at 193° C., can be liberated from the hydrochloride by means of concentrated 1:1 ammonia solution.

EXAMPLE 4

7.81 g. of p,p'-diacetyl-diphenyl-thiourea in 50 ml. of dimethylformamide are added to a solution of 9.8 g. of aminoguanidine bicarbonate in 15 ml. of water and 15.4 ml. of hydrochloric acid 1:1 (6,17 normal) and the batch stirred in a stirring flask for 14 hours at 50° C. The clear solution is filtered and cooled; crystallization takes place gradually. The reaction mixture is filtered with suction and washed with a little water and ethanol, to yield p,p'-diacetyl - diphenylthiourea-bis-guanylhydrazone-dihydrochloride of the formula

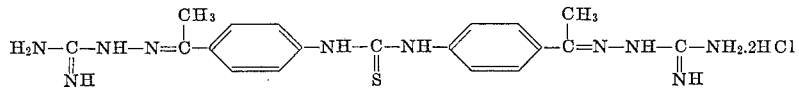

in the form of crystals melting at 212–214° C. The substance contains 1 to 2 mols of water of crystallization, depending on the degree of drying.

EXAMPLE 5

61.5 ml. of hydrochloric acid 1:1 (6.17 normal) are added to 39.2 g. of aminoguanidine bicarbonate, suspended in 60 ml. of water, to prepare a clear solution. 31.23 g. (0.1 mol) of m,m'-diacetyl-diphenylthiourea, suspended in 200 ml. of dimethylformamide, are added to this solution and the whole stirred for 14 hours in a bath at 50° C. The reaction mixture is filtered, the clear solution evaporated in vacuo, the residue dissolved in 250 ml. of water, filtered again from a turbidity and allowed to crystallize. The crystals are isolated to yield m,m'-diacetyl-diphenylthiourea - bis - guanylhydrazone dihydrochloride of the formula

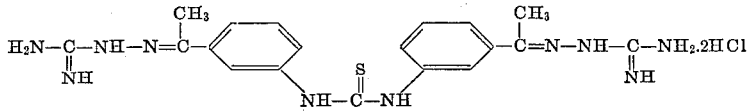

melting at 200–205° C. with decomposition.

EXAMPLE 6

13.18 g. of 1,3-bis-(para-acetylphenyl)-guanidine are added to a solution of aminoguanidine hydrochloride, prepared from 17.55 g. of aminoguanidine bicarbonate in 30 ml. of water and 27.8 ml. of hydrochloric acid 1:1 (6.15 N). After addition of 90 ml. of dimethylformamide the reaction mixture is stirred for 10 hours at 80° C. The clear solution is filtered and evaporated to half its volume in vacuo, 1,3-bis-(para-acetylphenyl)-guanidine-bis-guanylhydrazone trihydrochloride of the formula

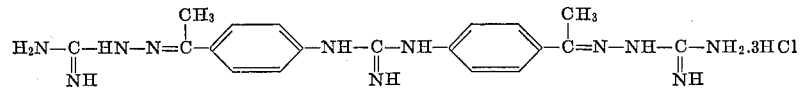

crystallizing out. The crystals are separated by filtration and washed with water and ethanol; M.P. >310° C.

The 1,3 - bis - (para-acetyl-phenyl)-guanidine used as starting material may be prepared as follows:

2.5 g. of sodium are dissolved in 100 ml. of absolute ethanol. 31.24 g. of p,p'-diacetyl-diphenylthiourea, suspended in 200 ml. of ethanol, are added to the solution. The resulting clear solution is heated for 1 hour at 90° C., then cooled to 25° C., and 14.9 g. of methyliodide in 50 ml. of ethanol are added dropwise. The batch is stirred for 5 hours in a bath at 95° C. The clear solution is filtered and ammonia gas is introduced into this solution directly for 1 hour with ice-water cooling, 1 hour at room temperature and 2 hours at 80° C. (internal temperature). The batch is cooled and filtered off from the first crystallization which is discarded, then evaporated to about 200 ml., and 1.4 liters of water are added. The first oily residue soon solidifies. The supernatant water is poured off and the residue allowed to stand with 300 ml. of ether. Crude 1,3 - bis - (para-acetylphenyl)-guanidine melting at 203–207° C. is obtained which is used directly for the above described reaction.

In an analogous manner from 1,3,-bis-(meta-acetylphenyl)-guanidine and aminoguanidine hydrochloride there can be obtained 1,3-bis-(meta-acetylphenyl)-guanidine-bis-guanyl-hydrazone trihydrochloride.

EXAMPLE 7

Tablets containing 10 mg. of p,p'-diacetyl-diphenyl-urea-bis-guanylhydrazone bis-hydrochloride may be prepared, for example with the following ingredients.

| Ingredients per tablet: | Mg. |
| --- | --- |
| p,p'-Diacetyl-diphenylurea - bis - guanylhydrazone-bis-hydrochloride | 10.0 |
| Lactose | 45.0 |
| Wheat starch | 20.0 |
| Colloidal silicic acid | 5.0 |
| Arrowroot | 14.5 |
| Talc | 5.0 |
| Magnesium stearate | 0.5 |
| | 100.0 |

Method p,p'-Diacetyl-diphenylurea - bis - guanylhydrazone bis-hydrochloride is mixed with the lactose, part of the wheat starch and colloidal silicic acid and then sieved. The remaining wheat starch is pasted with five times the quantity of water on a steam-bath. With this paste the powdery mixture, possibly with the addition of water, is kneaded until a granulatable mass is formed. This mass is pressed through a sieve having a mesh of about 3 mm., dried at 45° C. and then pressed through a sieve having a mesh of 0.8 mm. Arrowroot, talc and magnesium stearate are added to hte dry granulate, the resulting mixture compressed into tablets having a gross weight of 100 mg.

EXAMPLE 8

An injection solution containing 10 mg. of p,p'-diacetyl-diphenylurea - bis - guanylhydrazone - bis-methanesulfonate may be prepared, for example, as follows:

Ingredients:
    p,p'-Diacetyl-diphenylurea - bis - guanylhydrazone-bis-methanesulfonate—10.0 mg.
    Mannitol—85.0 mg.
    Distilled water to make—1.0 ml.

Method

The p,p'-diacetyl-diphenylurea - bis - guanylhydrazone bis-methanesulfonate and mannitol are dissolved in distilled water so that in 1 ml. of solution 10.0 mg. of p,p'-diacetyldiphenylurea-bis-guanylhydrazone - bis - methanesulfonate and 85.0 mg. of mannitol are contained. The solution is filtered through a membrane filter No. 1 and filled into ampoules while being gassed with nitrogen. The fused ampoules are heated in an autoclave at 120° C. for 20 minutes.

EXAMPLE 9

3.50 g. of N,N'-(para,para'-diacetyl-diphenyl)-parabanic acid are suspended in 20 ml. of dimethylformamide. The suspension is poured into a solution of 3.92 g. of aminoguanidine bicarbonate in 6 ml. of water and 6.15 ml. of hydrochloric acid 1:1 (6.15 N). The bath is stirred for 10 hours at a bath temperature of 80° C., then allowed to cool, and filtered. There are added 100 ml. of absolute ethanol, and after some time the batch is filtered with suction. The mother liquor is evaporated under reduced pressure and the residue dissolved in 50 ml. of ethanol. Crystallization sets in again. The resulting third crystallizate melts at 225–231° C. and is the N,N'-(para, para'-diacetyl-diphenyl)-parabanic acid - bis - guanylhydrazone-dihydrochloride-dihydrate of the formula

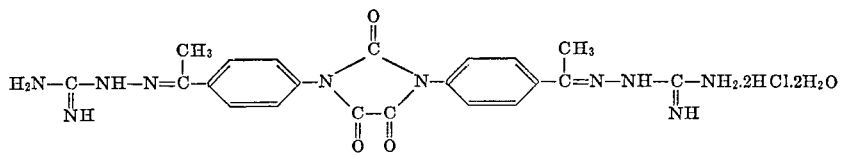

In a similar manner, N,N'-(meta,meta'-diacetyl-diphenyl)-parabanic acid - bis - guanylhydrazone-dihydrochloride can be obtained.

The N,N' - (para,para'-diacetyl-diphenyl) - parabanic acid used as starting material can be prepared as follows:

29.6 g. of para,para'-diacetyl-diphenylurea are suspended in 300 ml. of chloroform, the suspension treated dropwise with 14.0 g. of oxalyl chloride in 50 ml. of chloroform, and the whole stirred for 6 hours at an oil bath temperature of 70° C. The batch is filtered with suction and the precipitate washed with chloroform and then recrystallized from 100 ml. of dimethylformamide. The crystallizate is considerably contaminated with starting material. On addition of 100 ml. of ethanol to the mother liquor, N,N' - (para,para'-diacetyl-diphenyl) - parabanic acid of melting point 259–262° C. is obtained.

What is claimed is:

1. A member selected from the group consisting of compounds of the formula

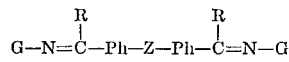

in which G stands for guanidino, R for lower alkyl, Ph for a member selected from the group consisting of meta-phenylene, and para-phenylene, and Z for a group of the formula

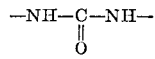

and their acid addition salts of therapeutically acceptable acids.

2. A product as claimed in claim 1 in the form of an acid addition salt thereof with a therapeutically acceptable acid.

3. A product as claimed in claim 1, in which G stands for guanidino, R for lower alkyl, Ph for para-phenylene and Z for the group of the formula

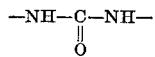

4. A product as claimed in claim 3 in the form of an acid addition salt thereof with a therapeutically acceptable acid.

5. A product as claimed in claim 1, which product is the p,p'-diacetyl-diphenylurea-bis-guanylhydrazone of the formula or an acid addition salt thereof with a therapeutically acceptable acid.

6. A product as claimed in claim 5 in the form of an acid addition salt thereof with a therapeutically acceptable acid.

7. A product as claimed in claim 1, which product is the m,m'-diacetyl-diphenylurea-bis-guanylhydrazone or an acid addition salt thereof with a therapeutically acceptable acid.

8. p,p'-Diacetyl-diphenylurea - bis - guanylhydrazone-bis-methanesulfonate.

9. p,p'-Diacetyl-diphenylurea - bis - guanylhydrazone-dihydrochloride.

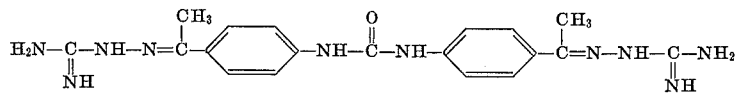

References Cited

UNITED STATES PATENTS 2,815,377   12/1957   Meiser _____ 260—501.14

OTHER REFERENCES

J. Am. Med. Asc., vol. 200, No. 6, May 8, 1967, Medical News, p. 31.

BERNARD HELFIN, Primary Examiner

M. W. GLYNN, Assistant Examiner

U.S. Cl. X.R.

260—309.1, 309.5, 501.11, 501.12, 552, 553, 565; 424—269, 274, 316, 322, 326